(12) United States Patent
Hara

(10) Patent No.: US 8,297,813 B2
(45) Date of Patent: Oct. 30, 2012

(54) VEHICULAR LAMP

(75) Inventor: Ryosuke Hara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 297 days.

(21) Appl. No.: 12/824,784

(22) Filed: Jun. 28, 2010

(65) Prior Publication Data

US 2011/0002135 A1    Jan. 6, 2011

(30) Foreign Application Priority Data

Jul. 1, 2009   (JP) ................. 2009-156888

(51) Int. Cl.
*F21V 7/04* (2006.01)
(52) U.S. Cl. ........................ 362/516; 362/487
(58) Field of Classification Search .................. 362/487, 362/496, 516, 538, 540
See application file for complete search history.

(56) References Cited

U.S. PATENT DOCUMENTS 6,059,435 A * 5/2000 Hamm et al. ................. 362/514
7,607,809 B2 * 10/2009 Misawa ........................ 362/501

FOREIGN PATENT DOCUMENTS

JP    2000-276917    10/2000

* cited by examiner

*Primary Examiner* — David V Bruce
(74) *Attorney, Agent, or Firm* — Fish & Richardson, P.C.

(57) ABSTRACT

A vehicular lamp includes: a lamp outer housing composed of a lamp housing with an opening on one side and a cover attached to the lamp housing to close the opening; a light source disposed inside the lamp outer housing; a reflector that is disposed inside the lamp outer housing, reflects light emitted from the light source, and is formed with an optical path notch or an optical path hole which serves as a path for a part of the light emitted from the light source; and a control optical section having a lens member attached to the reflector so as to close the optical path notch or the optical path hole, and controlling light emitted from the light source toward the optical path notch or the optical path hole to guide the light in a predetermined direction for radiation.

4 Claims, 3 Drawing Sheets

VEHICULAR LAMP

CROSS-REFERENCE TO RELATED APPLICATION

This application claims the benefit of priority of Japanese Patent Application No. 2009-156888, filed on Jul. 1, 2009, the contents of which are incorporated by reference herein.

BACKGROUND

1. Technical Field

The present disclosure relates to a vehicular lamp. More particularly, the present disclosure relates to a vehicular lamp having a control optical section with a lens member that closes a reflector in which an optical path notch or an optical path hole is formed. This arrangement makes effective use of light while securing a size reduction.

2. Related Art

Some vehicular lamps include a lamp outer housing composed of a lamp housing and a cover that closes an opening of the lamp housing, a light source inside the lamp outer housing, and a reflector inside the lamp outer housing to reflect light emitted from the light source to guide the light in a predetermined direction.

Some such vehicular lamps are configured to have a small thickness (size) in the front-back direction and to secure a wide light radiation range (see, e.g., Japanese Patent Application Laid-Open (Kokai) No. JP-A-2000-276917).

In the vehicular lamp disclosed in JP-A-2000-276917, a part of the reflector is bent in a predetermined shape to provide a primary reflective surface and a secondary reflective surface positioned farther away from the light source than the primary reflective surface, and the reflector is formed with an open portion that allows passage of light emitted from the light source. The light emitted from the light source is reflected by the primary reflective surface, or passes through the open portion so as to be incident on and reflected by the secondary reflective surface.

In the vehicular lamp disclosed in JP-A-2000-276917, however, some of the light emitted from the light source passes through the open portion, and the flux of light that passed through the open portion becomes gradually wider as the light travels farther away from the open portion. Thus, depending on the position and the size of the secondary reflective surface, some of the light that passed through the open portion is not incident on the secondary reflective surface and, therefore, the light emitted from the light source may not be used effectively.

When some of the light that passed through the open portion is not incident on the secondary reflective surface, the brightness of the radiated light reflected by the primary reflective surface and the brightness of the radiated light reflected by the secondary reflective surface may be significantly different from each other. In this case, the brightness of light may be uneven in the radiation range to cause uneven brightness.

SUMMARY

One object of the present invention is to provide a vehicular lamp that makes effective use of light while securing a size reduction and a wide radiation range.

The present disclosure describes a vehicular lamp including: a lamp outer housing composed of a lamp housing with an opening on one side and a cover attached to the lamp housing to close the opening; a light source disposed inside the lamp outer housing; a reflector that is disposed inside the lamp outer housing, reflects light emitted from the light source, and is formed with an optical path notch or an optical path hole which serves as a path for a part of the light emitted from the light source; and a control optical section having a lens member attached to the reflector so as to close the optical path notch or the optical path hole, and controlling light emitted from the light source toward the optical path notch or the optical path hole to guide the light into a predetermined direction for radiation.

Thus, the light emitted from the light source toward the optical path notch or the optical path hole is guided in a predetermined direction by the control optical section.

In some cases, it is possible to make effective use of light emitted from a light source while securing a size reduction and a wide radiation range.

By effectively using the light, the brightness of the light reflected by the reflector and the brightness of the light reflected by the reflective member can be made uniform to prevent occurrence of uneven brightness.

In some implementations, the control optical section is composed of a condenser lens used as the lens member and a reflective member that reflects light condensed by the condenser lens.

Thus, the size of the reflective portion can be reduced to further reduce the size of the vehicular lamp.

In some embodiments, the control optical section is composed of a lens member that allows the light emitted from the light source to pass through and that guides the light to the cover. Thus, the number of components of the control optical section is small, which contributes to reducing the number of parts and simplifying the structure.

In some implementations, lens steps are formed on the lens member. Thus, transmitted light can be controlled easily.

DETAILED DESCRIPTION

In the following paragraphs, preferred modes for carrying out a vehicular lamp according to the present invention are described with reference to the accompanying drawings.

As described below, the vehicular lamp is applied to a so-called daytime running lamp that is turned on during the daytime to function as a marker lamp. The vehicular lamp is not limited to a daytime running lamp, but is widely applicable to various types of vehicular lamps for use in vehicles such as vehicular headlamps and vehicular marker lamps.

Figure 1:
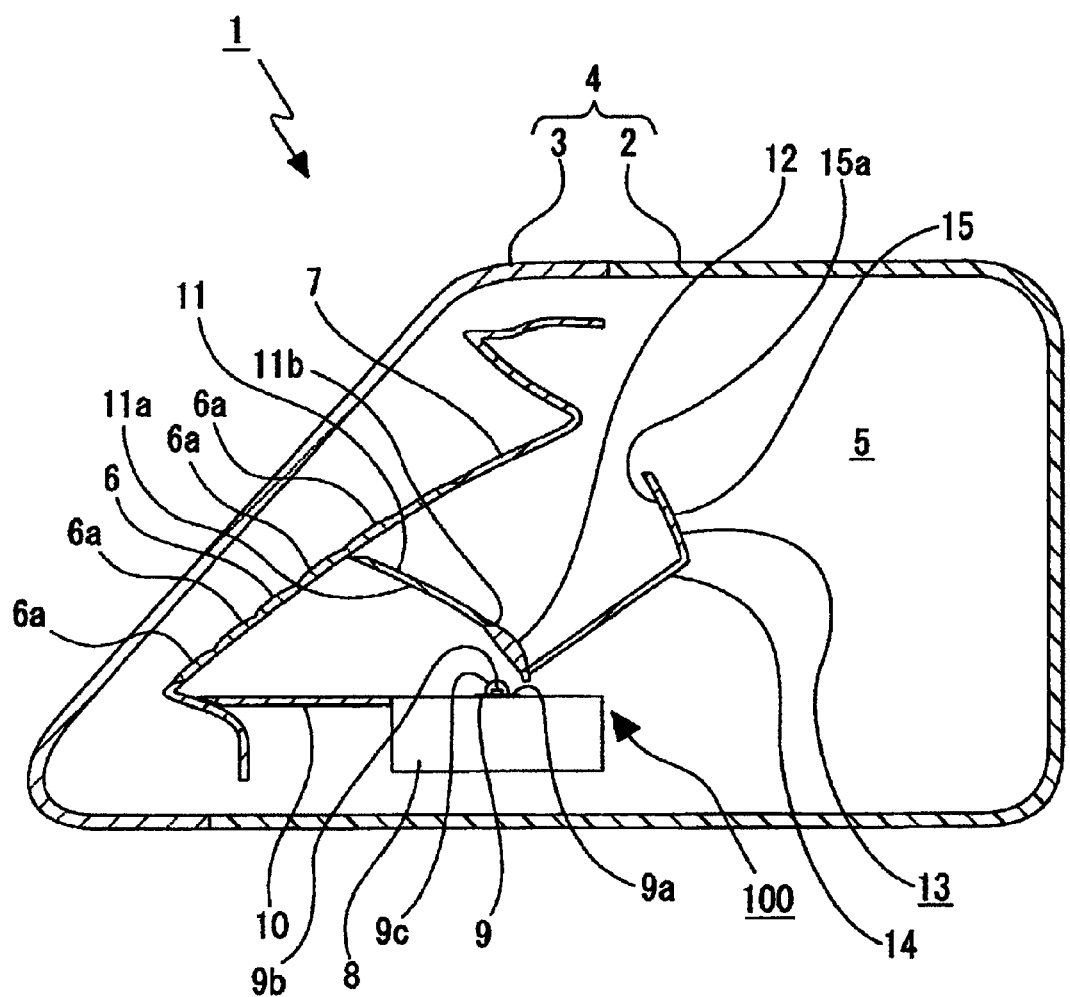
FIG. 1 is a schematic vertical cross-sectional view of a vehicular lamp, showing preferred modes for carrying out a vehicular lamp according to the present invention, in conjunction with FIGS. 2 and 3.

As shown in FIG. 1, the vehicular lamp (daytime running lamp) 1 includes a lamp housing 2 with an opening on one side and a cover 3 attached to the lamp housing 2 to close the opening. The lamp housing 2 and the cover 3 form a lamp outer housing 4. A lamp chamber 5 is formed inside the lamp outer housing 4.

In the lamp chamber 5, an inner lens 6 is disposed at a position opposite the cover 3. The inner lens 6 is disposed in an inclined manner. Lens steps 6a, 6a, . . . having a predetermined shape are formed on a surface of the inner lens 6, for example.

An extension 7 is disposed on the outer peripheral side of the inner lens 6. The extension 7 has shields a part of a structure disposed in the lamp chamber 5.

A placement base 8 and a light emitting unit 9 disposed on the placement base 8 are located in the lamp chamber 5.

The placement base 8 is formed from a metal material with high heat radiation to function as a heat radiation member, for example.

The light emitting unit 9 includes a circuit board 9a, a light source 9b mounted on the circuit board 9a to serve as a light source, and a protective cover 9c that covers the light source 9b to protect the light source 9b. A light-emitting diode (LED), for example, is used as the light source 9b.

A blocking plate 10 facing in the vertical direction is disposed between the placement base 8 and the extension 7. The upper surface of the blocking plate 10 and the upper surface of the placement base 8 are positioned to be generally flush with each other.

In the lamp chamber 5, a reflector 11 is disposed above the light emitting unit 9. A reflective surface 11a is formed on the inner surface of the reflector 11. An optical path hole 11b is formed in the reflector 11 at a position directly above the light emitting unit 9, for example. The optical path hole 11b serves as a path for a part of light emitted from the light source 9b. In the reflector 11, an optical path notch may be formed in place of the optical path hole 11b.

A lens member 12 is attached to the reflector 11 so as to close the optical path hole 11b. A condenser lens, for example, is used as the lens member 12.

A reflective member 13 is attached to an end of the reflector 11 on the optical path hole 11b side. The reflective member 13 is composed of an attached portion 14, the lower end of which is attached to the reflector 11, and a reflective portion 15 projecting from the upper end of the attached portion 14 in a generally orthogonal direction. A reflective surface 15a is formed on the inner surface of the reflective portion 15. The reflective portion 15 is positioned obliquely above the lens member 12.

The placement base 8, the light emitting unit 9, the reflector 11, the lens member 12, and the reflective member 13 described above form a lamp unit 100.

Figure 2:
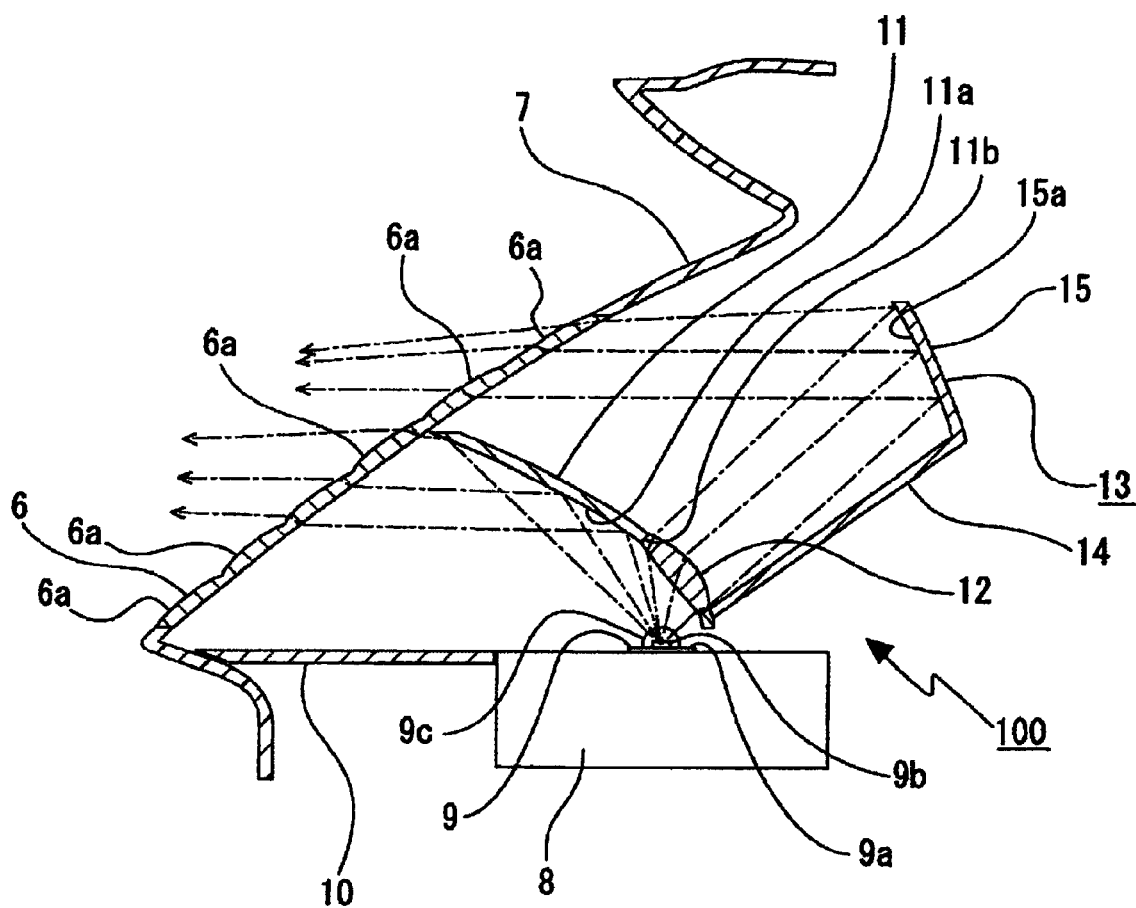
FIG. 2 is an enlarged cross-sectional view showing a path of light emitted from a light source in a lamp unit in which a condenser lens and a reflective member are used as a control optical section.

In the lamp unit 100 configured as described above, when the light emitting unit 9 is driven to emit light from the light source 9b, a portion of the emitted light is reflected by the reflective surface 11a of the reflector 11, and passes through the inner lens 6 and the cover 3 to be radiated outward, as shown in FIG. 2.

The light emitted from the light source 9b and not reflected by the reflective surface 11a is incident on the lens member 12 which closes the optical path hole 11b, and is condensed by the lens member 12 to be guided to the reflective surface 15a of the reflective member 13. The light guided to the reflective surface 15a is reflected by the reflective surface 15a, and passes through the inner lens 6 and the cover 3 to be radiated outward.

In this way, the light emitted from the light source 9b toward the optical path hole 11b is controlled by the lens member 12 and the reflective member 13 to be guided into a predetermined direction. Thus, the lens member 12 and the reflective member 13 serve as a control optical section that controls the light emitted from the light source 9b toward the optical path hole 11b so as to guide the light into a predetermined direction for radiation.

As described above, in the lamp unit 100, the light emitted from the light source 9b is reflected by the reflective surface 11a of the reflector 11 and the reflective surface 15a of the reflective member 13 to be radiated outward. Therefore, light can be radiated over a wide radiation range.

The two reflective surfaces 11a, 15a are used to radiate light over a wide range. Thus, the space for disposing the components in the front-back direction can be reduced compared to a configuration in which a single reflector is used to radiate light over a wide range. Thus, the size of the vehicular lamp 1 can be reduced.

As described above, in the vehicular lamp 1 including the lamp unit 100, the lens member 12 which closes the optical path hole 11b formed in the reflector 11 is provided so that the lens member 12 guides light to the reflective surface 15a of the reflective member 13 for radiation. Therefore, the light emitted from the light source 9b can be used effectively while securing a size reduction and a wide radiation range.

By effectively using the light, the brightness of the light reflected by the reflective surface 11a of the reflector 11 and the brightness of the light reflected by the reflective surface 15a of the reflective member 13 can be made uniform to prevent occurrence of uneven brightness.

Further, in the vehicular lamp 1 including the lamp unit 100, a condenser lens is used as the lens member 12. Therefore, the size of the reflective surface 15a of the reflective member 13 can be accordingly reduced to further reduce the size of the vehicular lamp 1.

Although a condenser lens is used as the lens member 12 in the example described above, a diffusion lens, for example, may be used as the lens member 12. Also in the case where a diffusion lens is used as the lens member 12, all the light incident on the diffusion lens can be guided to the reflective surface 15a by increasing the area of the reflective surface 15a.

Figure 3:
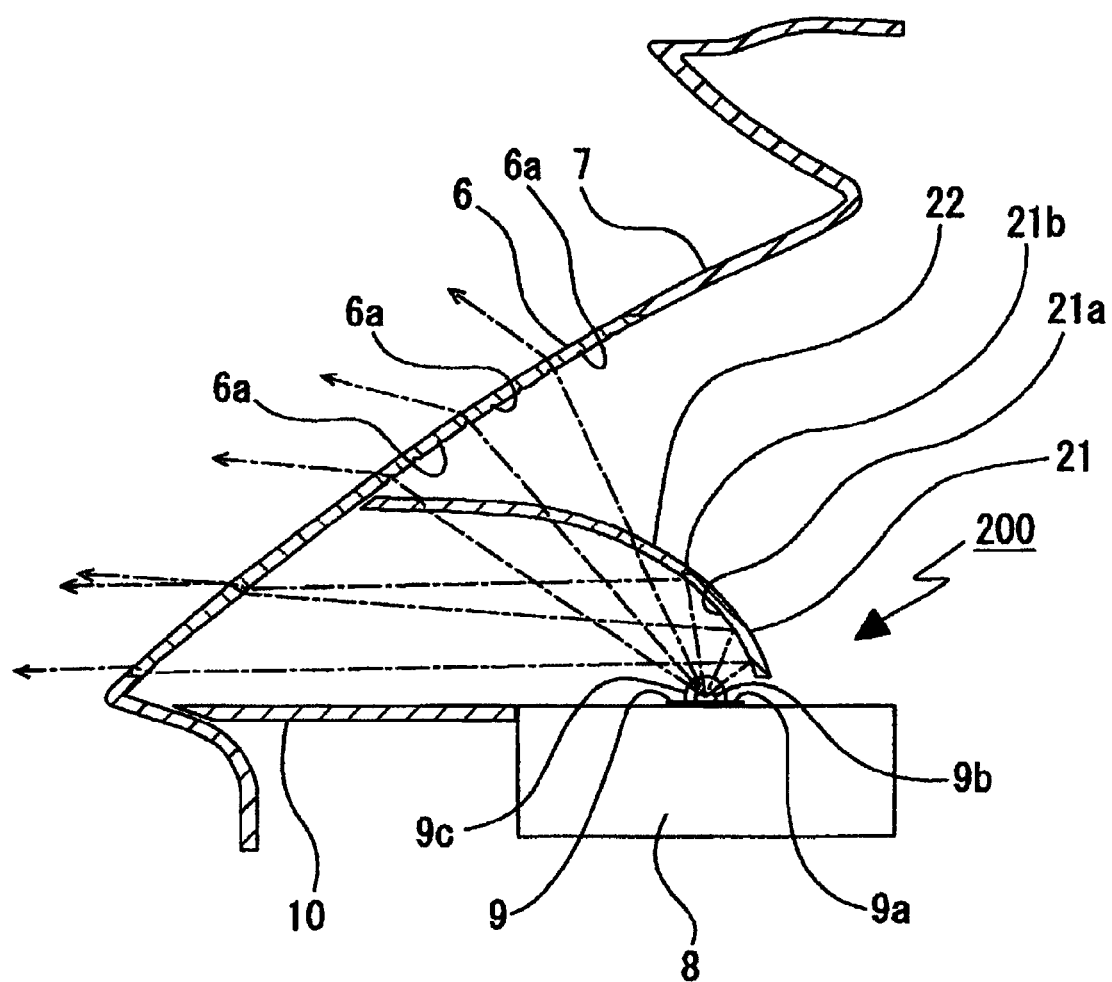
FIG. 3 is an enlarged cross-sectional view showing a path of light emitted from a light source in a lamp unit in which a plate-like lens is used as a control optical section.

The vehicular lamp 1 including a lamp unit 200 will be described below (see FIG. 3). The lamp unit 200 is different from the lamp unit 100 described above in that an optical path notch is formed in the reflector, a lens member that closes the optical path notch is disposed in the reflector, and no reflective member is provided. Thus, in the description below, only differences from the lamp unit 100 are described in detail; other components and features are assigned the same reference numerals as those assigned to similar components and features in the description of the lamp unit 100 and detailed descriptions of such components and features are omitted.

In the lamp chamber 5, a reflector 21 is disposed directly above the light emitting unit 9. A reflective surface 21a is formed on the inner surface of the reflector 21. An optical path notch 21b is formed in the reflector 21 on the upper end edge side, for example. The optical path notch 21b serves as a path for a part of light emitted from the light source 9b. In the reflector 21, an optical path hole may be formed in place of the optical path notch 21b.

A lens member 22 is attached to the reflector 21 so as to close the optical path notch 21b. A plate-like lens, for example, is used as the lens member 22. Predetermined lens steps (not shown) are formed on the surface of the lens member 22. One end of the lens member 22 is attached to the upper end edge of the reflector 21, and the other end of the lens member 22 is positioned in the proximity of the inner lens 6.

The placement base 8, the light emitting unit 9, the reflector 21, and the lens member 22 described above form the lamp unit 200.

In the lamp unit 200 configured as described above, when the light emitting unit 9 is driven to emit light from the light source 9b, a portion of the emitted light is reflected by the reflective surface 21a of the reflector 21, and passes through the inner lens 6 and the cover 3 to be radiated outward.

The light emitted from the light source 9b and not reflected by the reflective surface 21a is incident on the lens member 22 which closes the optical path notch 21b, and is controlled by the lens member 22 in the traveling direction to be guided to the inner lens 6. The light guided to the inner lens 6 passes through the inner lens 6 and the cover 3 to be radiated outward.

In this way, the light emitted from the light source 9b toward the optical path notch 21b is controlled by the lens member 22 to be guided in a predetermined direction. Thus, the lens member 22 serves as a control optical section that controls the light emitted from the light source 9b toward the optical path notch 21b so as to guide the light into a predetermined direction for radiation.

As described above, in the lamp unit 200, the light emitted from the light source 9b is reflected by the reflective surface 21a of the reflector 21 and controlled by the lens member 22 to be radiated outward. Therefore, light can be radiated over a wide radiation range.

The reflective surface 21a and the lens member 22 are used to radiate light over a wide range. Thus, the space for positioning the components in the front-back direction can be reduced compared to a case where a single reflector is used to radiate light over a wide range. Thus, the size of the vehicular lamp 1 can be reduced.

As described above, in the vehicular lamp 1 including the lamp unit 200, the lens member 22 which closes the optical path notch 21b formed in the reflector 21 is provided so that the lens member 22 guides light to the inner lens 6 for radiation. Therefore, the light can be used effectively while securing a size reduction and a wide radiation range.

By effectively using the light, the brightness of the light reflected by the reflective surface 21a of the reflector 21 and the brightness of the light that passed through the lens member 22 can be made uniform to prevent occurrence of uneven brightness.

Further, in the vehicular lamp 1 including the lamp unit 200, the control optical section is formed by only the lens member 22 which guides the light emitted from the light source 9b to the cover 3 via the inner lens 6. Therefore, the number of components of the control optical section is small, which contributes to reducing the number of parts and simplifying the structure.

In addition, in the vehicular lamp 1 including the lamp unit 200, the lens steps are formed on the lens member 22. Therefore, transmitted light can be controlled easily.

The lens member 22 can be a lens with light collecting property, or can be a lens with light diffusing property.

The lens members 12, 22 can be formed such that a part of the incidence plane is formed as a reflective surface which reflects light. As the lens members 12, 22, a so-called Fresnel lens having a shape of a large number of annular prisms can be used. In the case where a Fresnel lens is used as the lens members 12, 22, a part of a structure disposed inside the lamp chamber 5 is not easily seen from the outside, which improves the appearance.

Further, in the vehicular lamp 1, the predetermined lens steps 6a, 6a, . . . are formed on the inner lens 6. By the effect of the lens steps 6a, 6a, . . . , the light radiated outward can be guided into a predetermined direction.

The shape and structure of various portions described above are merely illustrative examples that may be used in embodying the present invention, and should not be construed as limiting the technical scope of the present invention. Accordingly, other implementation are within the scope of the claims.

What is claimed is:

1. A vehicular lamp comprising:
 a lamp outer housing composed of a lamp housing with an opening on one side and a cover attached to the lamp housing to close the opening;
 a light source disposed inside the lamp outer housing;
 a reflector disposed inside the lamp outer housing, arranged to reflect light emitted from the light source, and having an optical path notch or an optical path hole which serves as a path for a portion of the light emitted from the light source; and
 a control optical section having a lens member attached to the reflector so as to close the optical path notch or the optical path hole, and arranged to control light emitted from the light source toward the optical path notch or the optical path hole to guide the light in a predetermined direction for radiation.

2. The vehicular lamp according to claim 1 wherein the control optical section is composed of a condenser lens used as the lens member and a reflective member that reflects light condensed by the condenser lens.

3. The vehicular lamp according to claim 1 wherein the control optical section is composed of a lens member that allows the light emitted from the light source to pass through and that guides the light to the cover.

4. The vehicular lamp according to claim 3 wherein lens steps are on the lens member.

* * * * *